June 11, 1929.  R. R. DOWNIE  1,716,432
EXCAVATING SCOOP
Original Filed May 22, 1926
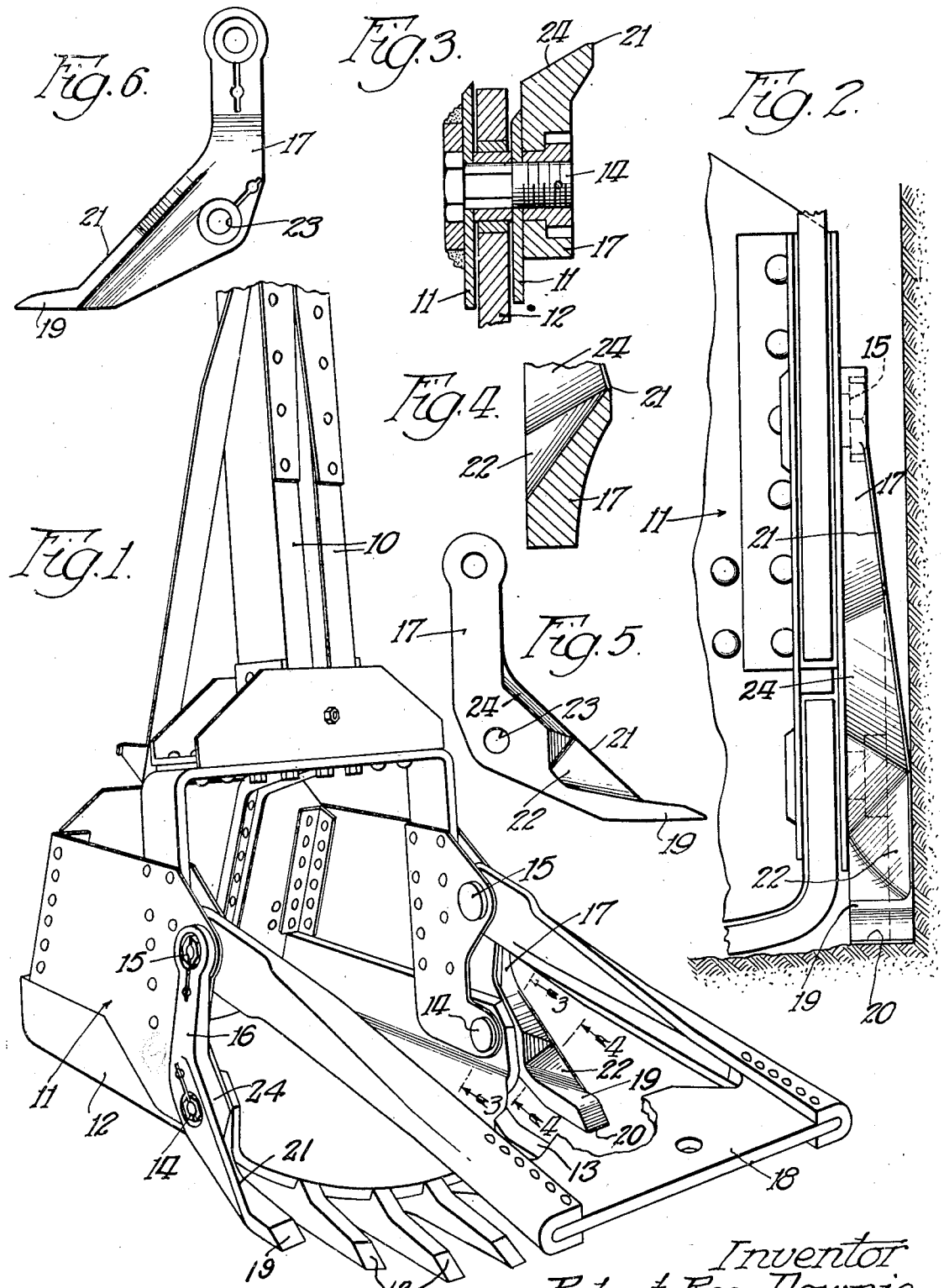
Inventor
Robert Rex Downie
Emery, Booth, Janney & Varney, Attys.

Patented June 11, 1929.

1,716,432

UNITED STATES PATENT OFFICE.

ROBERT REX DOWNIE, OF BEAVER FALLS BOROUGH, PENNSYLVANIA, ASSIGNOR TO KEYSTONE DRILLER COMPANY, A CORPORATION OF PENNSYLVANIA.

EXCAVATING SCOOP.

Original application filed May 22, 1926, Serial No. 111,002. Divided and this application filed January 3, 1927. Serial No. 158,739.

This invention relates to excavating scoops and methods, and among other objects, aims to provide side rake teeth which are highly efficient in excavating, which are economical to manufacture, are readily resharpened, are easily assembled with and removed from the scoop and are of extremely rugged construction.

The invention may be understood by reference to one illustrative embodiment shown in the accompanying drawings, in which:

Fig. 1 is a perspective view of a scoop of a ditching machine shown equipped with the side rake teeth of my invention;

Fig. 2 is an enlarged fragmentary elevation, looking at the scoop from the end which carries the side rake teeth, showing how the teeth cut clearance for the walls of the scoop;

Fig. 3 is an enlarged section substantially on line 3—3 of Fig. 1;

Fig. 4 is an enlarged section substantially on line 4—4 of Fig. 1;

Fig. 5 is a side elevation of one of the side rake teeth, on the scale of Fig. 1; and Fig. 6 is a similar view on the same scale, showing the reverse side of the tooth.

In excavating machines of the type shown in my prior Patent 1,511,114, a scoop rigidly secured to the end of a "ditcher stick" is provided with a pivoted bottom for dumping its load and with excavating teeth at the open end, including what are known as side rake teeth made fast to the sides of the scoop. The primary function of these side rake teeth is to cut a clearance for the scoop, so as to permit both longitudinal motion of the scoop and lateral rocking, as in clearing an obstruction or in excavating along a curved line. A further result obtained is the protection of the pivotal structure of the scoop bottom, which is important because unless the bottom swings freely, the scoop will be practically useless. Another, but somewhat subordinate advantage realized by the use of side rake teeth, is the protection of the sides of the scoop from wear and abrasion from the material excavated. The side rake teeth shown in said prior patent, while completely operative, during an excavation crowd the material sidewise, tending to choke the entry of the scoop and being somewhat wasteful of power. According to the present invention, side rake teeth are provided which lift the material in the process of penetration, and then turn it sidewise in the direction of the open mouth of the scoop, thus facilitating the entry of the scoop and saving power.

Referring more specifically to the drawings, there is shown the lower part of a ditcher stick 10 to which a scoop 11 is secured so as to be rigid thereon. The preferred means for securing the scoop are described and claimed in my Patent No. 1,709,466, dated April 16, 1929. The pivoted bottom 12 of the scoop carries the usual excavating teeth 13, and swings on the axis of two bolts 14, at opposite sides of the scoop, said bolts, with bolts 15, serving to secure side rake teeth 16, 17 on the sides of the scoop, adjacent its open mouth. A bail 18 is also secured by bolts 15 to the scoop, and swings freely, so that a power actuated hauling line (not shown) attached to the bail may force the scoop through the material to be excavated. The described method of securing the side rake teeth is claimed in a copending application (Serial No. 111,002, of which this application is a division), and is the preferred method; but obviously the teeth may be secured satisfactorily in other ways.

As the two side rake teeth are exactly alike, except for such differences as are necessary to permit their use on opposite sides of the scoop, a description of the right hand side rake tooth 17, which is illustrated in all the figures of the drawings, will suffice for both.

The side rake tooth 17 consists of a shank, which tapers toward its upper end, as shown in Fig. 2, and a point 19 having one or more beveled surfaces, so as to provide a material-dividing edge 20 which is substantially horizontal when the scoop is horizontal, as shown in Fig. 1. Preferably the point is of sufficient dimensions, as shown, to permit redressing and reforging when it has been blunted or worn by excavation, and in this event may have two beveled surfaces, as best shown in Figs. 5 and 6, so that the material is lifted or moved in the direction of the open mouth of the scoop, in the process of penetration. Extending from the point 19 rearwardly is a shearing edge 21 which is at the outside of the tooth, and which may be either continuous, as shown, or discontinuous, i. e., two or more edges separated from each other. In the embodiment shown, the shearing edge 21 extends at an angle of 45° to the point 19 and has a length equal to about two-thirds the over-all length of the tooth. To facilitate shearing of the material and turning it in the direction of the scoop mouth, there is a sharply beveled surface 22 extending between the point of the tooth and its mid-portion. As the tooth is provided with a hole 23 at or near its mid-portion for the bolt 14 and associated parts (Fig. 3) in order to avoid material weakening of the tooth it is so shaped that the hole 23 passes through the widest part of the tooth, while the tooth does not diminish in thickness until the upper part of the shank is reached. To cut the proper clearance, the tooth is thickest from the point 19 to about the end of the beveled surface 22 and the shearing edge 21 projects outside the main body of the tooth which thus protects the bolt 14 and associated parts against wear and damage. Above the surface 22, the shearing edge 21 inclines toward the main body of the tooth, as shown in Fig. 2. At the mid-portion, a beveled surface 24 is provided, but this surface is less sharply inclined than surface 22 as best shown in Figs. 4 and 5. Both surfaces 22, 24 cooperate to guide or turn the sheared material in the direction of the mouth of the scoop.

The upper part of the tooth is of a reduced thickness, the point of least thickness being the upper extremity, for the purpose of permitting the scoop to lean toward the adjacent wall of the trench without gouging the wall or hindering the free longitudinal movement of the scoop. No cutting or shearing of the material is accomplished by the extreme upper end, which is provided primarily for securing the tooth rigidly on the scoop. As previously stated, the upper part of the tooth may be secured at various points on the scoop, but preferably is held by the bolt 15 which like bolt 14 permits pivoting of another part, in this instance, the bail 18, while holding the tooth immovably, yet readily removable.

The novelty and utility of the side rake tooth will appear when the manner in which the scoop excavates material is understood, and this will be clear from prior Patents Nos. 1,511,114 and 1,476,121. In excavating, the described side rake teeth first penetrate and disrupt the material, then divide or shear off that material which is in the path of excavation from that which is to remain as wall, then gather and direct the separated material into the mouth of the scoop,—thus performing the threefold function of cutting clearance for the upper part of the scoop to permit modifying the generally downward direction of excavation, clearance for the rear part of the scoop to permit modifying the generally forward direction of excavation, and clearance for the pivotal connections between the scoop bottom and the scoop sides. The described rake teeth combine strength, excavating efficiency, i. e., effectiveness of loosening and gathering the material proportional to the power expended, and economy of manufacture, and are easily resharpened or even reforged, are quickly mounted and removed, and may be made of the material best suited for the work, without sacrifice of other desiderata.

Obviously the present invention is not restricted to the particular embodiment thereof herein shown and described. Nor is it necessary that the side rake teeth be used only with scoops of the disclosed type, as they may be useful with other excavating scoops or buckets. Moreover, it is not indispensable that all the features of the invention be used conjointly since they may be employed advantageously in various combinations and subcombinations.

What is claimed is:

1. An excavating scoop comprising, in combination, a body; and side rake teeth secured to the body and each having an earth-dividing edge which lies in a plane substantially parallel to the side of the body and which extends at about an angle of 45° to the horizontal when the bottom of the scoop is substantially horizontal, and also having a material-penetrating point.

2. An excavating scoop comprising, in combination, a body; and side rake teeth secured to the outside of the body and each having a forwardly projecting point and an earth-dividing edge which is adjacent the outer face of the tooth, and having a surface adjacent said edge which is shaped so as to guide the material into the mouth of the scoop.

3. An excavating scoop comprising, in combination, a body; and side rake teeth secured to the body and each having an earth-dividing edges which is adjacent the outer face of the tooth, and also having a beveled point; the mid portion of the tooth being the widest and thickest part of the tooth; and an aperture in said mid portion permitting the tooth to be secured to the scoop.

4. An excavating scoop comprising, in combination, a body; and side rake teeth secured to the body and each having an earth-dividing edge which extends at about an angle of 45° to the horizontal, and also having a beveled point; the end of the tooth tapering and nearly horizontal, the mid portion of the tooth being the widest and thickest part of the tooth, and having a sharply beveled section extending upwardly from the tapering, horizontal end to the mid portion, so as to cleave the material being excavated and to turn such material into the mouth of the scoop.

5. An excavating scoop comprising, in combination, a body; and side rake teeth secured to the body and each having a point which is nearly horizontal when the scoop is horizontal, and an earth-dividing edge which extends at about an angle of 45° to the hoizontal; each tooth having apertures in its mid portion and at the upper end of the tooth permitting it to be secured to the scoop so as to be immovable.

6. As an article of manufacture, a side rake tooth for excavating scoops having a material-dividing edge extending a substantial portion of the length thereof and also having a beveled point the edge of which lies substantially at right angles to the material-dividing edge.

7. As an article of manufacture, a side rake tooth for excavating scoops having an earth-dividing edge which extends at about an angle of 45° to the horizontal; and an aperture in its mid portion permitting the tooth to be secured to the scoop; and a second aperture at the upper end of the tooth permitting it to be secured at a second point, so as to be immovable.

8. As an article of manufacture, a side rake tooth for excavating scoops having a point at one end, and a cutting edge extending the greater portion of the length thereof, but stopping short of each end, and having beveled surfaces extending at different angles to said cutting edge, the more acuate angled surface being nearer the point.

9. As an article of manufacture, a side rake tooth for excavating scoops having a generally arcuate form and subtending approximately a quadrant so as to have a point which may be horizontal when the opposite end of the tooth shank is substantially vertical; the middle portion of the tooth being beveled in differing degrees and having an earth-dividing edge at substantially 45° to the extremities of the tooth.

10. As an article of manufacture, a side rake tooth for excavating scoops having a generally arcuate form and subtending approximately a quadrant so as to have a point which may be horizontal when the opposite end of the tooth shank is substantially vertical; said tooth having a material-dividing edge extending longitudinally thereof for the greater portion of its length but stopping short of each end, and having beveled surfaces at different angles to said cutting edge, the more acute angled surface being nearer the point; and spaced apertures, one about the middle of the tooth, the other at the end of the tooth, permitting the tooth to be secured by bolts.

11. As an article of manufacture, a side rake tooth for excavating scoops having a generally arcuate form and subtending approximately a quadrant so as to have a point which may be horizontal when the opposite end of the tooth shank is substantially vertical; said tooth having a material-dividing edge extending longitudinally thereof for the greater portion of its length but stopping short of each end, and having beveled faces at different angles to said cutting edge, the more acute angled surface being nearer the point; the point of the tooth being beveled in two different planes and having an edge extending laterally of the tooth.

12. As an article of manufacture, a side rake tooth for excavating scoops having a tapering point so shaped and of such dimensions as to provide sufficient stock for re-dressing of the point and to permit reshaping of the point by forging, and to have a relatively great material-penetrating effect; the point having a horizontal edge at its extremity to divide the material laterally relative to the tooth.

13. As an article of manufacture, a side rake tooth for excavating scoops having a tapering point beveled in two different planes and shaped so as to provide sufficient stock for re-forging and to have a relatively great material-penetrating effect; the point having an edge at its extremity to divide the material laterally relative to the tooth, and having a thickness substantially equal to the greatest thickness of the tooth.

14. An excavating scoop comprising, in combination, a body; and side rake teeth secured to the sides of the body adjacent the open mouth thereof; each tooth having a point and a longitudinal shearing edge, the point and edge so disposed and arranged that as the tooth is advanced through the material to be excavated, the material is divided first in a more or less horizontal plane by means of the point, and second, in a substantially vertical plane by means of the shearing edge; the teeth thus lifting the material in the process of penetration and then turning it sidewise in the direction of the mouth of the scoop.

15. As an article of manufacture, a side rake tooth for excavating scoops having a point and a longitudinal shearing edge, the point and edge so disposed and arranged that as the tooth is advanced through the material to be excavated, the material is divided first in a more or less horizontal plane by means of the point, and second, in a substantially vertical plane by means of the shearing edge.

16. An excavating scoop comprising, in combination, a body; a bottom pivoted to the body; side rake teeth secured outside the side walls of the body adjacent the upright edges and each having two material dividing edges so arranged that the teeth cut a clearance for the upper part and rear of the scoop to permit modifying the direction of movement of the scoop through the material being excavated, and also cut sufficient clearance for the bottom pivots to minimize abrasion and damage to the same from contact with the material being excavated.

17. As an article of manufacture, a side rake tooth for excavating scoops having a tapering point shaped so as to provide sufficient stock for re-forging and so as to have a relatively great material-penetrating effect; the point having an edge at its extremity to divide and elevate the material lying in the path of the tooth, said edge extending to the outermost bounding plane of the tooth.

18. As an article of manufacture, a side rake tooth tapered toward its upper end and having a material-dividing edge extending longitudinally thereof for the greater portion of its length but terminating short of either end; a tapering point having a material-penetrating edge extending to the outermost plane of the tooth; and an inclined face at an acute angle to the material-dividing edge to turn the material in the direction in which the face inclines; said material-dividing edge lying in the outermost plane aforesaid for a portion of its length and slanting inwardly where the tooth tapers toward its upper end.

In testimony whereof I have signed my name to this specification.

ROBERT REX DOWNIE.